United States Patent
Hirose et al.

(10) Patent No.: US 8,828,539 B2
(45) Date of Patent: Sep. 9, 2014

(54) ACRYLIC PRESSURE-SENSITIVE ADHESIVE, ACRYLIC PRESSURE-SENSITIVE ADHESIVE LAYER AND ACRYLIC PRESSURE-SENSITIVE ADHESIVE TAPE OR SHEET

(75) Inventors: Tetsuya Hirose, Osaka (JP); Shinji Inokuchi, Osaka (JP); Kazuhisa Maeda, Osaka (JP); Yusuke Sugino, Osaka (JP)

(73) Assignee: Nitto Denko Corporation, Osaka (JP)

( * ) Notice: Subject to any disclaimer, the term of this patent is extended or adjusted under 35 U.S.C. 154(b) by 513 days.

(21) Appl. No.: 12/933,297

(22) PCT Filed: Mar. 16, 2009

(86) PCT No.: PCT/JP2009/055088
§ 371 (c)(1),
(2), (4) Date: Dec. 2, 2010

(87) PCT Pub. No.: WO2009/116504
PCT Pub. Date: Sep. 24, 2009

(65) Prior Publication Data
US 2011/0070434 A1  Mar. 24, 2011

(30) Foreign Application Priority Data

Mar. 17, 2008 (JP) .................................. 2008-068595
Feb. 21, 2009 (JP) .................................. 2009-038706

(51) Int. Cl.
| C09J 133/08 | (2006.01) |
| C09J 133/10 | (2006.01) |
| B32B 7/12 | (2006.01) |
| C09J 7/02 | (2006.01) |

(52) U.S. Cl.
CPC .............. C09J 7/0217 (2013.01); C09J 133/08 (2013.01)

USPC .................................... 428/355 AC; 525/228

(58) Field of Classification Search
None
See application file for complete search history.

(56) References Cited

U.S. PATENT DOCUMENTS

| 5,654,387 | A | 8/1997 | Bennett et al. |
| 7,431,985 | B2 | 10/2008 | Iwama |
| 2005/0080195 | A1 | 4/2005 | Iwama |
| 2005/0202238 | A1* | 9/2005 | Kishioka et al. ........ 428/355 AC |
| 2006/0292365 | A1* | 12/2006 | Iwama ...................... 428/355 R |

FOREIGN PATENT DOCUMENTS

| EP | 0303430 A1 | 2/1989 |
| JP | 54-3136 | 1/1979 |
| JP | 1-139665 A | 6/1989 |

(Continued)

OTHER PUBLICATIONS

Machine translation of JP2001-049200 A to Nakazawa et al., patent application publication date Feb. 20, 2001.*

(Continued)

*Primary Examiner* — Vu A Nguyen
(74) *Attorney, Agent, or Firm* — Sughrue Mion, PLLC

(57) ABSTRACT

The present invention relates to an acrylic pressure-sensitive adhesive including: a) an acrylic polymer containing, as a monomer unit, an alkyl (meth)acrylate including an alkyl group having 1 to 20 carbon atoms in an amount of 50% by weight or more; and b) a tackifier resin, in which the acrylic polymer a) contains two kinds of monomer units having a difference in solubility parameter (SP value) of 0.2 $(MPa)^{1/2}$ or more, each in an amount of 15% by weight or more.

13 Claims, 1 Drawing Sheet

(56) References Cited

FOREIGN PATENT DOCUMENTS

| | | | |
|---|---|---|---|
| JP | 6-200225 | A | 7/1994 |
| JP | 6-207151 | A | 7/1994 |
| JP | 8-27450 | A | 1/1996 |
| JP | 9-505103 | A | 5/1997 |
| JP | 10-509198 | A | 9/1998 |
| JP | 11-504054 | T | 4/1999 |
| JP | 2001-49200 | A | 2/2001 |
| JP | 2002-241709 | A | 8/2002 |
| JP | 2002-285114 | A | 10/2002 |
| JP | 2003-049130 | A | 2/2003 |
| JP | 2005-239831 | A | 9/2005 |
| WO | WO 95/13328 | A1 | 5/1995 |
| WO | 03/068280 | A1 | 8/2003 |

OTHER PUBLICATIONS

International Search Report [PCT/ISA/210] issued May 26, 2009, in PCT/JP2009/055088.
Written Opinion [PCT/ISA/237] issued May 26, 2009, in PCT/JP2009/055088.
Chinese Office Action dated Feb. 13, 2012 issued in Chinese Application No. 200980109352.8.
Communication from the Japanese Patent Office dated Mar. 27, 2012, in a counterpart application No. 2009-038706.
Extended European Search Report issued on Nov. 16, 2011 in the corresponding European Patent Application No. 09721511.1.
Office Action, dated Jan. 24, 2013, issued by the State Intellectual Property Office of P.R. China in counterpart Chinese Application No. 200980109352.8.
Office Action, dated Sep. 5, 2013, issued by the Japanese Patent Office, in counterpart Application No. 2009038706.
Communication issued Aug. 26, 2013, by the European Patent Office in corresponding European application No. 09 721 511.5.
Notice of Third Party Submission, dated Jan. 14, 2014 in counterpart Japanese Application No. 2009-038706.
Office Action, dated for Jan. 28, 2014, issued by the Japanese Patent Office in counterpart Japanese Application No. 2009-038706.

* cited by examiner

ACRYLIC PRESSURE-SENSITIVE ADHESIVE, ACRYLIC PRESSURE-SENSITIVE ADHESIVE LAYER AND ACRYLIC PRESSURE-SENSITIVE ADHESIVE TAPE OR SHEET

TECHNICAL FIELD

The present invention relates to an acrylic pressure-sensitive adhesive excellent in adhesive performance to polyolefin adherents or poorly adherent coated plates and including an acrylic polymer and a tackifier resin, an acrylic pressure-sensitive adhesive layer including the acrylic pressure-sensitive adhesive, and an acrylic pressure-sensitive adhesive tape or sheet.

BACKGROUND ART

Conventionally, acrylic pressure-sensitive adhesive tapes or sheets have been widely used, because they are excellent in light resistance, weather resistance, oil resistance and the like, and excellent in pressure-sensitive adhesiveness such as pressure-sensitive adhesive force and cohesive force and in anti-aging properties such as heat resistance and weather resistance.

However, the acrylic pressure-sensitive adhesive tapes or sheets have not been sufficient in adhesive performance to nonpolar adherends such as polyolefins represented by polypropylene. Further, the adhesive performance to coated plates, particularly to coated plates that have recently become poor in adhesiveness by the influence of the shift to applications for acid rain resistance or aqueous systems has not been satisfactory.

There have been known techniques for enhancing the adhesive performance to these nonpolar adherends such as polyolefins, and there is disclosed an acrylic polymer in which a monomer having a specific SP value and a Tg of 15° C. or more is copolymerized (patent document 1). However, when a large number of parts of the monomer having a Tg of 15° C. or more is copolymerized, the Tg of the polymer increases to cause deterioration of low-temperature adhesiveness. Further, in such a copolymerization amount that the low-temperature adhesiveness is not deteriorated, the adhesive performance to the nonpolar adherends has not been sufficiently obtained in some cases. Furthermore, there is disclosed a method of adding a specific tackifier resin such as rosin or a hydrogenated petroleum-based resin to an acrylic polymer (patent documents 2 and 3). However, even when this method is used, the adhesive performance to the nonpolar adherends has not been sufficiently obtained in some cases. In addition, there is disclosed a method of adding an acrylic oligomer having a weight-average molecular weight of 20,000 or less to an acrylic polymer (patent document 4). However, the acrylic oligomer having a weight-average molecular weight of 20,000 or less and being capable of improving the adhesive performance to the polyolefins is poor in compatibility with the acrylic polymer used as a pressure-sensitive adhesive, and when a pressure-sensitive adhesive tape is stored for a long period of time or at high temperature, a problem of deterioration in the adhesive performance has occurred in some cases. Further, the use of an acrylic oligomer having a weight-average molecular weight of 20,000 or less and a Tg of 25° C. or more is disclosed (patent document 5). However, the use of such an oligomer results in poor compatibility with an acrylic polymer, and when a pressure-sensitive adhesive tape is stored for a long period of time or at high temperature, a problem of deterioration in the adhesive performance has occurred in some cases.

On the other hand, as a method for improving the adhesive performance to the poorly adherent coated plates, there is known, for example, a method of copolymerizing a cyclic acrylamide or an N-vinyl cyclic amide with an acrylic polymer (patent document 6). Even when such a method is used, the adhesive performance to the poorly adherent coated plates has not been sufficient in some cases. Further, it is necessary to add a polar monomer at high parts for exhibiting the characteristics, which has caused a problem of deterioration in water resistance in some cases. Furthermore, it is disclosed to use a polymer obtained from an acrylic monomer and an olefinic polymer having a polymerizable unsaturated double bond at a terminal thereof (patent document 7). However, when this technique is used, the olefinic polymer having a polymerizable unsaturated double bond at a terminal thereof has a low polymerization degree, and the rate thereof remained without being copolymerized has increased, or the conversion of the acrylic monomer has also been deteriorated in some cases. In addition, the resulting viscoelastic body has had a disadvantage such that the cohesive force is weak, resulting in failure to exhibit holding performance.

Patent Document 1; JP-A-10-509198
Patent Document 2; JP-A-6-207151
Patent Document 3; JP-T-11-504054
Patent Document 4; JP-A-2001-49200
Patent Document 5; JP-A-2003-49130
Patent Document 6; JP-A-6-200225
Patent Document 7; JP-A-2005-239831

DISCLOSURE OF THE INVENTION

An object of the invention is to provide an acrylic pressure-sensitive adhesive showing excellent adhesive performance to polyolefin adherends or poorly adherent coated plates and having small changes in adhesive performance after storage, an acrylic pressure-sensitive adhesive layer including the acrylic pressure-sensitive adhesive, and an acrylic pressure-sensitive adhesive tape or sheet.

The present inventors have made intensive studies in order to achieve the above object, and as a result, have found that it is possible to provide an acrylic pressure-sensitive adhesive excellent in adhesive performance to nonpolar adherends such as polyolefins or poorly adherent coated plates and having small changes in adhesive performance after storage, an acrylic pressure-sensitive adhesive layer including the acrylic pressure-sensitive adhesive, and an acrylic pressure-sensitive adhesive tape or sheet, by an acrylic pressure-sensitive adhesive including an acrylic polymer and a tackifier resin, in which the acrylic polymer and/or the tackifier resin contain two kinds of monomer units having a difference in solubility parameter (SP value) of 0.2 $(MPa)^{1/2}$ or more, each in an amount of 15% by weight or more, thereby completing the invention.

That is to say, the invention relates to an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more.

Further, the invention relates to an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the tackifier resin contains two kinds of monomer units having a difference in solubility parameter (SP value) of 0.2 $(MPa)^{1/2}$ or more, each in an amount of 15% by weight or more.

Furthermore, the invention relates to an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more, and the tackifier resin contains two kinds of monomer units having a difference in solubility parameter (SP value) of 0.2 $(MPa)^{1/2}$ or more, each in an amount of 15% by weight or more.

The above tackifier resin is preferably an acrylic oligomer.

Further, the acrylic polymer in the acrylic pressure-sensitive adhesive of the invention preferably contains, as a monomer unit, at least one of 2-ethylhexyl acrylate and butyl acrylate unit in an amount of 15% by weight or more.

Furthermore, it is preferred that the acrylic polymer in the acrylic pressure-sensitive adhesive of the invention contains, as monomer units, at least one of 2-ethylhexyl acrylate and butyl acrylate and at least one of butyl acrylate and octadecyl acrylate, each in an amount of 15% by weight or more.

The acrylic oligomer in the acrylic pressure-sensitive adhesive of the invention preferably has a glass transition temperature (Tg) of 20° C. or more and a weight-average molecular weight of 2,000 to 20,000.

The acrylic oligomer in the acrylic pressure-sensitive adhesive of the invention preferably contains, as a monomer unit, cyclohexyl (meth)acrylate in an amount of 15% by weight or more.

It is preferred that the acrylic oligomer in the acrylic pressure-sensitive adhesive of the invention contains, as monomer units, cyclohexyl (meth)acrylate and any one of acryloyl morpholine, diethylacrylamide, isobutyl methacrylate and isobornyl methacrylate, each in an amount of 15% by weight or more.

It is possible to obtain the acrylic pressure-sensitive adhesive of the invention by irradiating an ultraviolet ray to an acrylic pressure-sensitive adhesive composition including: an acrylic polymer containing an alkyl (meth)acrylate including an alkyl group having 1 to 20 carbon atoms in an amount of 50% by weight or more or a partially polymerized product thereof; a photopolymerization initiator; and a tackifier resin.

The acrylic pressure-sensitive adhesive of the invention can be utilized as an acrylic pressure-sensitive adhesive layer.

The invention further relates to an acrylic pressure-sensitive adhesive tape or sheet having the acrylic pressure-sensitive adhesive layer, and relates to an acrylic pressure-sensitive adhesive tape or sheet in which the acrylic pressure-sensitive adhesive layer is formed by an acrylic pressure-sensitive adhesive composition. Further, the invention relates to an acrylic pressure-sensitive adhesive tape or sheet in which the acrylic pressure-sensitive adhesive layer is formed on at least one side of a substrate.

According to the invention, since the pressure-sensitive adhesive has the above constitution, it becomes possible to provide the acrylic pressure-sensitive adhesive showing excellent adhesive performance to the polyolefin adherends or the poorly adherent coated plates and having small changes in adhesive performance after storage, the acrylic pressure-sensitive adhesive layer including the acrylic pressure-sensitive adhesive, and the acrylic pressure-sensitive adhesive tape or sheet.

DESCRIPTION OF REFERENCE NUMERALS AND SIGNS

Figure 1A:
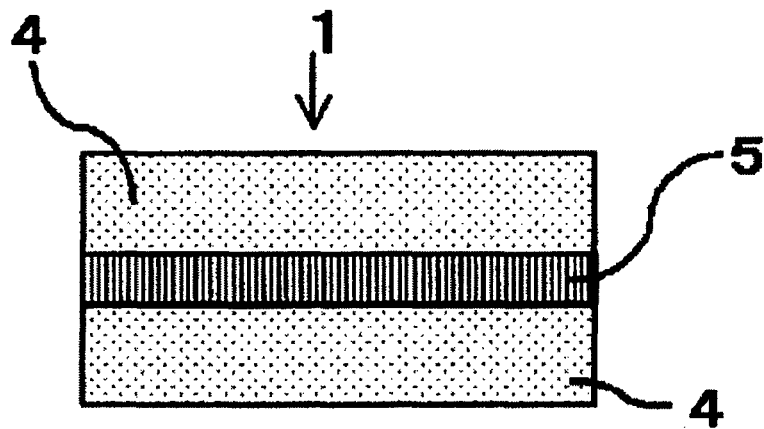
FIGS. 1(a) to 1(c) are schematic cross-sectional views partially showing examples of pressure-sensitive adhesive tapes or sheets of the invention.

1: Acrylic pressure-sensitive adhesive tape in which acrylic pressure-sensitive adhesive layers including an acrylic pressure-sensitive adhesive is formed
2: Acrylic pressure-sensitive adhesive tape in which an acrylic pressure-sensitive adhesive layer including an acrylic pressure-sensitive adhesive is formed
3: Acrylic pressure-sensitive adhesive tape in which an acrylic pressure-sensitive adhesive layer including an acrylic pressure-sensitive adhesive is formed
4: Acrylic pressure-sensitive adhesive layer including an acrylic pressure-sensitive adhesive
5: Substrate

BEST MODE FOR CARRYING OUT THE INVENTION

A first aspect in the invention is an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more.

Further, a second aspect in the invention is an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the tackifier resin contains two kinds of monomer units having a difference in solubility parameter (SP value) of 0.2 $(MPa)^{1/2}$ or more, each in an amount of 15% by weight or more.

Furthermore, a third aspect in the invention is an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more, and the tackifier resin contains two kinds of monomer units having a difference in solubility parameter (SP value) of 0.2 $(MPa)^{1/2}$ or more, each in an amount of 15% by weight or more.

(Acrylic Polymer)

The acrylic polymer in the invention contains, as a monomer unit, an alkyl (meth)acrylate including an alkyl group having 1 to 20 carbon atoms in an amount of 50% by weight or more. In the above acrylic polymer, the alkyl (meth)acrylates including an alkyl group having 1 to 20 carbon atoms can be used either alone or as a combination of two or more thereof.

The ratio of the alkyl (meth)acrylate including an alkyl group having 1 to 20 carbon atoms is 50% by weight or more, preferably 60% by weight or more, and more preferably 70% by weight or more, based on the total amount of monomer components for preparing the acrylic polymer.

(Alkyl (Meth)acrylate)

Examples of the alkyl (meth)acrylates including an alkyl group having 1 to 20 carbon atoms in the invention include $C_{1-20}$ alkyl (meth)acrylates (preferably $C_{2-14}$ alkyl (meth) acrylates and more preferably $C_{2-10}$ alkyl (meth)acrylates) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth) acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. Incidentally, the term "alkyl (meth)acrylate" means an alkyl acrylate and/or an alkyl methacrylate, and the term "(meth) . . . " in the invention has the same meaning.

Examples of the alkyl (meth)acrylates other than the alkyl (meth)acrylates including an alkyl group having 1-20 carbon atoms include (meth)acrylic acid esters having an alicyclic hydrocarbon group, such as cyclopentyl (meth)acrylate, cyclohexyl (meth)acrylate and isobornyl (meth)acrylate, and (meth)acrylic acid esters having an aromatic hydrocarbon group, such as phenyl (meth)acrylate, (meth)acrylic acid esters obtained from terpene compound derivative alcohols, and the like.

(Copolymerizable Monomer)

Further, the above acrylic polymer may contain another monomer component (copolymerizable monomer) copolymerizable with the above alkyl (meth)acrylate as needed, for the purpose of modifying cohesive force, heat resistance, crosslinking properties and the like. Accordingly, the above acrylic polymer may contain the polymerizable monomer together with the above alkyl (meth)acrylate as a main component. As the copolymerizable monomer, a monomer having a polar group can be suitably used.

Specific examples of the copolymerizable monomers include carboxyl group-containing monomers such as acrylic acid, methacrylic acid, carboxyethyl acrylate, carboxypentyl acrylate, itaconic acid, maleic acid, fumaric acid, crotonic acid and isocrotonic acid; hydroxyl group-containing monomers such as hydroxyalkyl (meth)acrylates such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate and (4-hydroxymethylcyclohexyl) (meth)acrylate; acid anhydride group-containing monomers such as maleic anhydride and itaconic anhydride; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate and (meth)acryloyloxynaphthalenesulfonic acid; phosphoric acid group-containing monomers such as 2-hydroxyethylacryloyl phosphate; (N-substituted) amide-based monomers such as (meth)acrylamide, N,N-dimethyl(meth)acrylamide, N,N-diethyl(meth)acrylamide, N-isopropyl(meth)acrylamide, N-butyl(meth)acrylamide, N-methylol(meth)acrylamide, N-methylolpropane(meth)acrylamide, N-methoxymethyl (meth)acrylamide and N-butoxymethyl(meth)acrylamide; succinimide-based monomers such as N-(meth)acryloyloxymethylenesuccinimide, N-(meth)acryloyl-6-oxyhexamethylenesuccinimide and N-(meth)acryloyl-8-oxyhexamethylenesuccinimide; maleimide-based monomers such as N-cyclohexylmaleimide, N-isopropylmaleimide, N-laurylmaleimide and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide and N-laurylitaconimide; vinyl esters such as vinyl acetate and vinyl propionate; nitrogen-containing heterocyclic monomers such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine and N-vinylmorpholine; N-vinylcarboxylic acid amides; lactam-based monomers such as N-vinylcaprolactam; cyanoacrylate monomers such as acrylonitrile and methacrylonitrile; aminoalkyl (meth)acrylate-based monomers such as aminoethyl (meth)acrylate, N,N-dimethylaminoethyl (meth)acrylate and t-butylaminoethyl (meth)acrylate; alkoxyalkyl (meth)acrylate-based monomers such as methoxyethyl (meth)acrylate and ethoxyethyl (meth)acrylate; styrenic monomers such as styrene and α-methylstyrene; epoxy group-containing acrylic monomers such as glycidyl (meth) acrylate; glycol-based acrylic ester monomers such as polyethylene glycol (meth)acrylate, polypropylene glycol (meth) acrylate, methoxyethylene glycol (meth)acrylate and methoxypolypropylene glycol (meth)acrylate; heterocycle, halogen atom or silicon atom-containing acrylic acid ester-based monomers such as tetrahydrofurfuryl (meth)acrylate, fluorine (meth)acrylate and silicon (meth)acrylate; olefinic monomers such as isoprene, butadiene and isobutylene; vinyl ether-based monomers such as methyl vinyl ether and ethyl vinyl ether; thioglycolic acid; vinyl esters such as vinyl acetate and vinyl propionate; aromatic vinyl compounds such as styrene and vinyltoluene; olefins or dienes such as ethylene, butadiene, isoprene and isobutylene; vinyl ethers such as vinyl alkyl ethers; vinyl chloride; alkoxyalkyl (meth)acrylate-based monomers such as methoxyethyl (meth)acrylate and ethoxyethyl (meth)acrylate; sulfonic acid group-containing monomers such as sodium vinylsulfonate; imido group-containing monomers such as cyclohexylmaleimide and isopropylmaleimide; isocyanate group-containing monomers such as 2-isocyanatoethyl (meth)acrylate; fluorine atom-containing (meth)acrylates; silicon atom-containing (meth)acrylates; and the like. Incidentally, one or two or more of these copolymerizable monomers can be used.

When the above acrylic polymer contains the above copolymerizable monomer together with the above alkyl (meth) acrylate as a main component, the carboxyl group-containing monomer can be suitably used. Above all, acrylic acid can be suitably used. The amount of the copolymerizable monomer used is not particularly limited. However, the copolymerizable monomer can be contained in an amount of usually 0.1 to 30% by weight, preferably 0.5 to 20% by weight and more preferably 1 to 15% by weight, based on the total amount of the monomer components for adjusting the above acrylic polymer.

Containing the copolymerizable monomer in an amount of 0.1% by weight or more prevents a decrease in cohesive force of the acrylic pressure-sensitive adhesive tape or sheet including the acrylic pressure-sensitive adhesive to obtain high shear strength. Further, adjustment to 30% by weight or less prevents an increase in cohesive force to be able to satisfy tackiness at ordinary temperature (25° C.).

(Polyfunctional Monomer)

The above acrylic polymer may contain a polyfunctional monomer as needed, in order to adjust the cohesive force of the acrylic pressure-sensitive adhesive to be formed.

Examples of the polyfunctional monomers include (poly) ethylene glycol (meth)acrylate, (poly)propylene glycol (meth)acrylate, neopentyl glycol (meth)acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyl di(meth)acrylate and hexyl di(meth)acrylate. Above all, trimethylolpropane tri(meth)acrylate, hexanediol di(meth)acrylate and dipentaerythritol hexa(meth)acrylate can be suitably used. The polyfunctional monomers can be used either alone or as a combination of two or more thereof.

Although the amount of the polyfunctional monomer used varies depending on its molecular weight, functional group number or the like, it is added to an amount of 0.01 to 3.0% by weight, preferably 0.02 to 2.0% by weight, and more preferably 0.03 to 1.0% by weight, based on the total amount of the monomer components for preparing the acrylic polymer.

When the amount of the polyfunctional monomer used exceeds 3.0% by weight based on the total amount of the monomer components for preparing the acrylic polymer, for example, the cohesive force of the acrylic pressure-sensitive adhesive excessively increases to decrease adhesive force in some cases. On the other hand, in the case of less than 0.01% by weight, for example, the cohesive force of the acrylic pressure-sensitive adhesive decreases in some cases.

(Tackifier Resin)

Examples of the tackifier resins in the present invention include rosin-based resins, terpene-based resins, aliphatic petroleum resins, aromatic petroleum resins, copolymerized petroleum resins, xylene resins and elastomers or hydrogenated products thereof, acrylic oligomers and the like.

The amount of the tackifier resin added is preferably from 3 to 60 parts by weight, and more preferably from 5 to 40 parts by weight, based on 100 parts by weight of the acrylic polymer. When the tackifier resin is added in an amount exceeding 60 parts by weight, the elastic modulus of the pressure-sensitive adhesive increases to deteriorate the adhesive performance at low temperature, or to result in no exhibition of pressure-sensitive adhesiveness even at room temperature, in some cases. Further, when the amount added is less than 3 parts by weight, the effect thereof is not obtained in some cases.

When the acrylic polymer is prepared by UV polymerization as described later, it is preferred to use the hydrogenated product or the acrylic oligomer, from the viewpoint of inhibition of polymerization. In particular, the acrylic oligomer can be suitably used. When the acrylic oligomer or the like is used, inhibition of polymerization in the UV polymerization is difficult to occur.

It is desirable that the acrylic oligomer in the invention has a glass transition temperature (Tg) of 20° C. or more, preferably 30° C. or more, and more preferably 40° C. or more. When the glass transition temperature (Tg) thereof is less than 20° C., the cohesive force of the polymer at a temperature equal to or higher than room temperature decreases, resulting in deterioration of holding performance or high-temperature adhesive performance in some cases.

On the other hand, it is desirable that the acrylic oligomer has a weight-average molecular weight of 2,000 to 20,000, preferably 2,500 to 15,000, and more preferably 3,000 to 10,000.

When the weight-average molecular weight thereof exceeds 20,000, the effect of improving pressure-sensitive adhesive performance of the pressure-sensitive adhesive tape is not sufficiently obtained in some cases. Further, in the case of less than 2,000, the pressure-sensitive adhesive performance or holding performance is deteriorated because the molecular weight becomes low.

The weight-average molecular weight is determined in terms of polystyrene by a GPC method. Specifically, using TSKgelGMH-H(20)×2 columns as columns in HPLC 8020 (manufactured by Tosoh Corporation), measurement is made under conditions of a flow rate of 0.5 ml/min using a tetrahydrofuran solvent.

(Method for Preparing Acrylic Oligomer)

The acrylic oligomer of the invention is prepared, for example, by polymerizing a (meth)acrylic acid ester by a solution polymerization method, a bulk polymerization method, an emulsion polymerization method, suspension polymerization, mass polymerization or the like.

Examples of such (meth)acrylic acid esters include alkyl (meth)acrylates such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, decyl (meth)acrylate and dodecyl (meth)acrylate, esters of (meth)acrylic acid with alicyclic alcohols such as cyclohexyl (meth)acrylate and isobornyl (meth)acrylate, and (meth)acrylic acid aryl esters such as phenyl (meth)acrylate and benzyl (meth)acrylate. Such (meth)acrylic acid esters can be used either alone or in combination.

Further, as a monomer unit constituting the acrylic oligomer used in the invention, cyclohexyl methacrylate can be suitably used.

(Monomer for Modification)

Further, in the acrylic oligomer, it is also possible to copolymerize a polymerizable unsaturated bond-containing monomer copolymerizable with the (meth)acrylic acid ester, in addition to the above (meth)acrylic acid ester component unit.

Examples of the polymerizable unsaturated bond-containing monomers copolymerizable with the above (meth)acrylic acid ester include (meth)acrylic acid; alkoxyalkyl (meth)acrylates such as methoxyethyl (meth)acrylate, ethoxyethyl (meth)acrylate, propoxyethyl (meth)acrylate, butoxyethyl (meth)acrylate and ethoxypropyl (meth)acrylate; salts such as alkali metal (meth)acrylates; (poly)alkylene glycol di(meth)acrylates such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate and tripropylene glycol di(meth)acrylate; multivalent (meth)acrylic acid esters such as trimethylolpropane tri(meth)acrylate; (meth)acrylonitrile; vinyl acetate; vinylidene chloride; vinyl chloride compounds such as 2-chloro ethyl (meth)acrylate; oxazoline group-containing polymerizable compounds such as 2-vinyl2-oxazoline, 2-vinyl-5-methyl-2-oxazoline and 2-isopropenyl-2-oxazoline; aziridine group-containing polymerizable compounds such as (meth)acryloylaziridine and 2-aziridinylethyl (meth)acrylate; epoxy group-containing vinyl monomers such as allyl glycidyl ether, glycidyl ether (meth)acrylate and 2-ethyl glycidyl ether (meth)acrylate; hydroxyl group-containing vinyl monomers such as 2-hydroxyethyl (meth)acrylate, 2-hydroxypropyl (meth)acrylate, monoester of (meth)acrylic acid and polypropylene glycol or polyethylene glycol and adducts of lactones and 2-hydroxyethyl (meth)acrylate; fluorine-containing vinyl monomers such as fluorine-substituted alkyl (meth)acrylates; unsaturated carboxylic acids such as itaconic acid, crotonic acid, maleic acid and fumaric acid, salts thereof, and (partial) ester compounds and acid anhydrides thereof reactive halogen-containing vinyl monomers such as 2-chloroethyl vinyl ether and vinyl monochloroacetate; amido group-containing vinyl monomers such as methacrylamide, N-methylol methacrylamide, N-methoxyethyl methacrylamide, Nbutoxymethyl methacrylamide and N-acryloyl morpholine; organic silicon-containing vinyl monomers such as vinyltrimethoxysilane, y-methacryloxypropyltrimethoxysilane, allyltrimethoxysilane, trimethoxysilylpropylallylamine and 2-methoxyethoxytrimethoxysilane; and besides, macro monomers having a radically polymerizable vinyl group at a terminal of the polymer in which the vinyl monomer is polymerized. These monomers may be copolymerized with the above (meth)acrylic acid esters, alone or in combination.

Further, a functional group having reactivity with an epoxy group or an isocyanate group may be introduced into the acrylic oligomer. Examples of such functional groups include a hydroxyl group, a carboxyl group, an amino group, an amido group and a mercapto group. When the acrylic oligomer is produced, the monomer having such a functional group is preferably used.

(Method for Adjusting Molecular Weight)

Further, in order to adjust the molecular weight of the acrylic oligomer, a chain transfer agent can be used during polymerization thereof. Examples of the chain transfer agents used in the invention include mercapto group-containing compounds such as octyl mercaptan, dodecyl mercaptan and t-dodecyl mercaptan; thioglycolic acid, ethyl thioglycolate, propyl thioglycolate, butyl thioglycolate, t-butyl thioglycolate, 2-ethylhexyl thioglycolate, octyl thioglycolate, decyl thioglycolate, dodecyl thioglycolate, ethylene glycol thioglycolate, neopentyl glycol thioglycolate and pentaerythritol thioglycolate. The thioglycolic acid compounds can be preferably used.

Although the amount of the chain transfer agent used is not particularly limited, the acrylic oligomer contains the chain transfer agent in an amount of usually 0.1 to 20 parts by weight, preferably 0.2 to 15 parts by weight, and more preferably 0.3 to 10 parts by weight, based on 100 parts by weight of the acrylic monomer constituting the acrylic oligomer. The acrylic oligomer having a suitable molecular weight can be obtained by adjusting the amount of the chain transfer agent added as described above.

As these other tackifier resins of the acrylic oligomers, there can be suitably used rosin ester resins: Pencel A, Pencel C, Pencel D-125, Pencel D-135 and Pencel D-160 (all manufactured by Arakawa Chemical Industries, Ltd.), heterogenized rosin ester resins, polymerized rosin ester resins, hydrogenated rosin ester resins, terpene-phenol resins and the like.

According to the invention, in the acrylic pressure-sensitive adhesive including the acrylic polymer and the tackifier resin, the acrylic polymer and/or the tackifier resin contain two kinds of monomer units having a difference in solubility parameter (SP value) of 0.2 $(MPa)^{1/2}$ or more, each in an amount of 15% by weight or more, thereby providing: the acrylic pressure-sensitive adhesive excellent in adhesive performance to nonpolar adherends such as polyolefins or poorly adherent coated plates and having small changes in adhesive performance after storage; the acrylic pressure-sensitive adhesive layer including the acrylic pressure-sensitive adhesive; and the acrylic pressure-sensitive adhesive tape or sheet.

In a mixture of the acrylic polymer and the tackifier resin, both are poor in compatibility with each other in a combination that can improve the adhesive performance, in many cases. In other words, ones that are good in compatibility with each other generally cannot exhibit a tackifying effect.

On the other hand, when the compatibility is poor, the performance at the time just after the acrylic pressure-sensitive adhesive tape or sheet is prepared from the acrylic pressure-sensitive adhesive is high. However, when the tape or sheet is stored at high temperature or for a long period of time, the tackifier resin or the acrylic oligomer is phase-separated from the acrylic polymer to deteriorate the adhesive performance.

When a completely different acrylic polymer, or tackifier resin or acrylic oligomer is used, in order to improve it, the performance entirely changes to disrupt a balance of the performance. Then, it has been found that as a method for improving compatibility without disrupting the balance of the performance, a method is suitable in which two kinds of monomer units having a difference in solubility parameter (SP value) of 0.2 $(MPa)^{1/2}$ or more are copolymerized each in an amount of 15% by weight or more, preferably 18% by weight or more, and more preferably 20% by weight or more, in the acrylic polymer and/or the tackifier resin in the acrylic pressure-sensitive adhesive including the acrylic polymer and the tackifier resin.

Further, in the acrylic pressure-sensitive adhesive including the above acrylic polymer and tackifier resin, the difference in solubility parameter (SP value) between the two kinds of monomer units to be copolymerized in the acrylic polymer and/or the tackifier resin is from 0.2 to 15 $(MPa)^{1/2}$, preferably from 0.4 to 14 $(MPa)^{1/2}$, and more preferably from 0.6 to 13 $(MPa)^{1/2}$.

The compatibility between the acrylic polymer and the tackifier resin is improved by using the above technique. The performance at the time just after the acrylic pressure-sensitive adhesive tape or sheet is prepared is high, and the adhesive performance does not deteriorate even after storage at high temperature or for a long period of time.

Although a mechanism by which such an effect is exhibited is uncertain, it is considered that the cohesive force of materials of the same kind is reduced by selecting and copolymerizing the monomer units having a difference in solubility parameter (SP value) of 0.2 $(MPa)^{1/2}$ or more, which enhances the compatibility between different kinds of materials.

The contents of the monomers to be copolymerized, which are 0.2 $(MPa)^{1/2}$ or more apart in solubility parameter (SP value) from each other, are each from 15 to 85% by weight, and more preferably each from 20 to 80% by weight. When the content of one monomer is less than 15% by weight, the effect of compatibility is not obtained. Accordingly, the strength after adhesion cannot be maintained.

In the acrylic polymer in the invention, as a combination of the monomers that are 0.2 $(MPa)^{1/2}$ or more apart in solubility parameter (SP value) from each other, there can be exemplified 2-ethylhexyl acrylate and butyl acrylate (the difference in SP value is 1.13 $(MPa)^{1/2}$), 2-ethylhexyl acrylate and octadecyl acrylate (the difference in SP value is 0.46 $(MPa)^{1/2}$), or the like.

Further, in the acrylic oligomer in the invention, as a combination of the monomers that are 0.2 $(MPa)^{1/2}$ or more apart in solubility parameter (SP value) from each other, there can be exemplified a combination such as cyclohexyl methacrylate and acryloyl morpholine (the difference in SP value is 5.87 $(MPa)^{1/2}$), cyclohexyl methacrylate and diethylacrylamide (the difference in SP value is 3.02 $(MPa)^{1/2}$), cyclohexyl methacrylate and isobornyl acrylate (the difference in SP value is 0.25 $(MPa)^{1/2}$), cyclohexyl methacrylate and isobornyl methacrylate (the difference in SP value is 0.71

(MPa)$^{1/2}$) or cyclohexyl methacrylate and isobutyl methacrylate (the difference in SP value is 1.16 (MPa)$^{1/2}$).

(Method for Calculating Solubility Parameter (SP Value))

In the invention, the solubility parameters (SP values) of the acrylic polymer and the tackifier resin can be determined by calculation according to the Fedors calculation method (see Polymer Eng. & Sci., vol. 14, No. 2 (1974), pages 148 to 154), namely, $$\delta = \left[ \frac{\sum_i \Delta ei}{\sum_i \Delta vi} \right]^{1/2} \quad \text{[Math. 1]}$$

in which $\Delta ei$ is evaporation energy at 25° C. attributing to atoms or groups, and $\Delta vi$ is the molar volume at 25° C.

$\Delta ei$ and $\Delta vi$ in the above numerical formula indicate definite numerical values given to i atoms and groups in a main molecule. Further, typical examples of the numerical values of $\Delta e$ and $\Delta v$ given to the atoms or groups are shown in the following Table 1:

TABLE 1

| Atom or Group | $\Delta e$ (J/mol) | $\Delta v$ (cm$^3$/mol) |
|---|---|---|
| CH$_3$ | 4086 | 33.5 |
| C | 1465 | −19.2 |
| Phenyl | 31940 | 71.4 |
| Phenylene | 31940 | 52.4 |
| COOH | 27628 | 28.5 |
| CONH$_2$ | 41861 | 17.5 |
| NH$_2$ | 12558 | 19.2 |
| —N= | 11721 | 5.0 |
| CN | 25535 | 24.0 |
| NO$_2$ (Aliphatic acid) | 29302 | 24.0 |
| NO$_2$ (Aromatic) | 15363 | 32.0 |
| O | 3349 | 3.8 |
| OH | 29805 | 10.0 |
| S | 14149 | 12.0 |
| F | 4186 | 18.0 |
| Cl | 11553 | 24.0 |
| Br | 15488 | 30.0 |

(Solubility Parameter (SP Value))

The solubility parameters (SP values) of main monomers obtained by the above formula are shown in the following Table 2:

TABLE 2

| Abbreviation | Name of Main Monomer | SP Value (MPa)$^{1/2}$ |
|---|---|---|
| IMA | Isomyristyl acrylate | 17.92 |
| ODA | Octadecyl acrylate | 18.33 |
| LA | Lauryl acrylate | 18.65 |
| I-NA | Isononyl acrylate | 18.69 |
| 2EHA | 2-Ethylhexyl acrylate | 18.79 |
| I-OA | Isooctyl acrylate | 18.79 |
| IBMA | Isobutyl methacrylate | 18.90 |
| MCBA | 3-(4-Methylcyclohexane-1-yl)butyl acrylate | 19.06 |
| IBXMA | Isobornyl methacrylate | 19.35 |
| IBXA | Isobornyl acrylate | 19.81 |
| BA | Butyl acrylate | 19.92 |
| CHMA | Cyclohexyl methacrylate | 20.06 |
| MMA | Methyl methacrylate | 20.24 |
| CHA | Cyclohexyl acrylate | 20.71 |
| DEAA | Diethylacrylamide | 23.08 |
| ACMO | Acryloyl morpholine | 25.93 |
| NVP | N-Vinylpyrrolidone | 27.27 |
| AA | Acrylic acid | 28.62 |

In the invention, the acrylic polymers are obtained by solution polymerization, emulsion polymerization, UV polymerization or the like of the above alkyl (meth)acrylates.

(Polymerization Initiator)

In the invention, the acrylic polymer can be easily formed by utilizing a curing reaction by heat or an ultraviolet ray using a thermal polymerization initiator or a photopolymerization initiator in the preparation of the acrylic polymer. In the invention, the photopolymerization initiator can be suitably used because of an advantage that the polymerization time can be shortened and the like. The polymerization initiators can be used either alone or as a combination of two or more thereof.

(Thermal Polymerization Initiator)

Examples of the thermal polymerization initiators include azo-based polymerization initiators (for example, 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, 2,2'-azobis(N,N'-dimethyleneisobutylamidine) dihydrochloride and the like, peroxide-based polymerization initiators (for example, dibenzoyl peroxide, t-butyl permaleate, lauroyl peroxide and the like), and redox polymerization initiators.

The amount of the thermal polymerization initiator used is not particularly limited, and may be any as long as it is within the range conventionally usable as the thermal polymerization initiator.

The photopolymerization initiator is not particularly limited, and there can be used, for example, a benzoin ether-based photopolymerization initiator, an acetophenone-based photopolymerization initiator, an α-ketol-based photopolymerization initiator, an aromatic sulfonyl chloride-based photopolymerization initiator, an photoactive oxime-based photopolymerization initiator, a benzoin-based photopolymerization initiator, a benzyl-based photopolymerization initiator, a benzophenone-based photopolymerization initiator, a ketal-based photopolymerization initiator, a thioxanthone-based photopolymerization initiator, an acylphosphine oxide-based photopolymerization initiator or the like.

Specifically, examples of the benzoin ether-based photopolymerization initiators include benzoin methyl ether, benzoin ethyl ether, benzoin propyl ether, benzoin isopropyl ether, benzoin isobutyl ether, 2,2-dimethoxy-1,2-diphenylethane-1-one(manufactured by Ciba Specialty Chemicals Corp., trade name: Irgacure-651), and anisole methyl ether. Examples of the acetophenone-based photopolymerization initiators include 1-hydroxycyclohexyl phenyl ketone (manufactured by Ciba Specialty Chemicals Corp., trade name: Irgacure-184), 4-phenoxydichloroacetophenone, 4-t-butyl-dichloroacetophenone, 1-[4-(2-hydroxyethoxy)-phenyl]-2-hydroxy-2-methyl-1-propane-1-one (manufactured by Ciba Specialty Chemicals Corp., trade name: Irgacure-2959), 2-hydroxy-2-methyl-1-phenyl-propane-1-one (manufactured by Ciba Specialty Chemicals Corp., trade name: Darocure-1173), and methoxyacetophenone. Examples of the α-ketol-based photopolymerization initiators include 2-methyl-2-hydroxypropiophenone and 1-[4-(2-hydroxyethyl)-phenyl]-2-hydroxy-2-methylpropane-1-one.

Examples of the aromatic sulfonyl chloride-based photopolymerization initiators include 2-naphthalenesulfonyl chloride. Examples of the photoactive oxime-based photopolymerization initiators include 1-phenyl-1,1-propanedione-2-(o-ethoxycarbonyl)-oxime.

Further, examples of the benzoin-based photopolymerization initiators include benzoin. Examples of the benzyl-based photopolymerization initiators include benzil. Examples of the benzophenone-based photopolymerization initiators include benzophenone, benzoylbenzoic acid, 3,3'-dimethyl-4-methoxybenzophenone, polyvinyl benzophenone and α-hydroxycyclohexyl phenyl ketone. Examples of the ketal-based photopolymerization initiators include benzyl dimethyl ketal. Examples of the thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone and dodecylthioxanthone.

Examples of the acylphosphine oxide-based photopolymerization initiators include bis(2,6-dimethoxybenzoyl)phenylphosphine oxide bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropane-1-yl)phosphine oxide, bis(2,6-dimethoxybenzoyl)-(1-methylpropane-1-yl)phosphine oxide, bis(2,6-dimethoxybenzoyl)-t-butylphosphine oxide, bis(2,6-dimethoxybenzoyl)cyclohexylphosphine oxide, bis (2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl)phosphine oxide, bis(2,4-dimethoxybenzoyl)(2-methylpropane-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2, 6-dimethoxybenzoyl)-2-phenylethylphosphine oxide, bis(2, 6-dimethoxybenzoyl)benzylphosphine oxide, bis(2,6-dimethoxybenzoyl)-2-phenylpropylphosphine oxide, bis(2, 6-dimethoxybenzoyl)-2-phenylethylphosphine oxide, 2,6-dimethoxybenzoylbenzylbutylphosphine oxide, 2,6-dimethoxybenzoylbenzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide, bis(2,6-dimethoxylbenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane and tri(2-methylbenzoyl)phosphine oxide.

Of these, particularly preferred are bis(2,4,6-trimethylbenzoyl)phenylphosphine oxide (manufactured by Ciba Specialty Chemicals Corp., trade name: Irgacure-819), bis(2,4,6-trimethylbenzoyl)-2,4-di-n-butoxyphenylphosphine oxide, 2,4,6-trimethylbenzoyldiphenylphosphine oxide (manufactured by BASF AG, trade name: Rucilin TPO) and bis(2,6-dimethoxylbenzoyl)-2,4,4-trimethylpentylphosphine oxide.

The amount of the photopolymerization initiator used is not particularly limited, but, for example, the photopolymerization initiator is blended within the range of 0.01 to 5 parts by weight, preferably 0.05 to 3 parts by weight and more preferably 0.08 to 2 parts by weigh, based on 100 parts of the monomer components for preparing the acrylic polymer.

When the amount of the photopolymerization initiator used is less than 0.01 part by weight herein, the polymerization reaction becomes insufficient in some cases. When amount of the photopolymerization initiator used exceeds 5 parts by weight, the photopolymerization initiator absorbs an ultraviolet ray, whereby the ultraviolet ray does not reach the inside of the pressure-sensitive adhesive layer to cause a decrease in the conversion or a decrease in the molecular weight of the polymer formed, resulting in a decrease in cohesive force of the pressure-sensitive adhesive layer formed. When the pressure-sensitive adhesive layer is separated from a film, a part of the pressure-sensitive adhesive layer remains on the film, which makes it impossible to reuse the film in some cases. Incidentally, the photopolymerization initiators can be used either alone or as a combination of two or more thereof.

(Crosslinking Agent)

In order to adjust the cohesive force, it is also possible to use a crosslinking agent, as well as the polyfunctional monomers described above. As the crosslinking agent, there can be used a crosslinking agent that has been usually used. Examples thereof include an epoxy-based crosslinking agent, an isocyanate-based crosslinking agent, a silicone-based crosslinking agent, an oxazoline-based crosslinking agent, an aziridine-based crosslinking agent, a silane-based crosslinking agent, an alkyl-etherified melamine-based crosslinking agent and a metal chelate-based crosslinking agent. In particular, an isocyanate-based crosslinking agent and an epoxy-based crosslinking agent can be suitably used.

Specifically, examples of the isocyanate-based crosslinking agents include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate and adduct compounds of these with polyhydric alcohols such as trimethylolpropane.

Examples of the epoxy-based crosslinking agents include bisphenol A, epichlorohydrin-type epoxy-based resins, ethylene glycol glycidyl ether, polyethylene glycol diglycidyl ether, glycerin diglycidyl ether, glycerin triglycidyl ether, 1,6-hexane diol glycidyl ether, trimethylol propane triglycidyl ether, diglycidylaniline, diamine glycidyl amine, N,N,N',N'-tetraglycidyl-m-xylenediamine and 1,3-bis(N,N'-diamine glycidyl aminomethyl)cyclohexane.

(Gel Fraction)

It is desirable that the acrylic pressure-sensitive adhesive layer including the acrylic pressure-sensitive adhesive of the invention has a gel fraction of 10% or more, preferably 15% or more, and more preferably 25% or more. When the gel fraction is less than 10%, the cohesive force of the acrylic pressure-sensitive adhesive layer including the acrylic pressure-sensitive adhesive is insufficient, resulting in deterioration of pressure-sensitive adhesiveness in some cases.

Further, it is desirable that the acrylic pressure-sensitive adhesive layer including the acrylic pressure-sensitive adhesive has a gel fraction of 99% or less, preferably 97% or less, and more preferably 95% or less. When the gel fraction exceeds 99%, adverse effects are exerted not only on viscoelastic characteristics of the acrylic pressure-sensitive adhesive layer including the acrylic pressure-sensitive adhesive, but also on the pressure-sensitive adhesiveness, appearance and the like thereof, in some cases.

The gel fraction is determined in the following manner. One gram of the acrylic pressure-sensitive adhesive layer including the acrylic pressure-sensitive adhesive is sampled, and the sample is precisely weighed. After this is immersed in about 50 ml of ethyl acetate at room temperature for 1 week, solvent insoluble matter is taken out and dried at 130° C. for 1 hour, followed by weighing. The gel fraction is calculated by the following formula:

Gel fraction(%)=[(weight after immersion and drying)/(weight of sample)]×100

(Microparticles)

Further, it is also possible to add microparticles to the above acrylic polymer for the purpose of improving shear adhesive force or processability of the acrylic pressure-sensitive adhesive tape or sheet including the above pressure-sensitive adhesive.

Examples of the above microparticles include particles of metals such as copper, nickel, aluminum, chromium, iron and stainless steel and metal oxide particles; particles of nitrides such as aluminum nitride, silicon nitride and boron nitride; ceramic particles represented by oxides such as glass, alumina and zirconia; microparticles of inorganic materials such as calcium carbonate, aluminum hydroxide, glass and silica; particles of natural raw materials such as volcanic shirasu and sand; hollow bodies of organic materials such as polystyrene, polymethyl methacrylate, a phenol resin, a benzoguanamine resin, a urea resin, a silicone resin, a nylon, a polyester, a polyurethane, polyethylene, polypropylene, a polyamide and a polyimide; and organic spheres such as nylon beads, acrylic beads and silicone beads.

As the microparticles, hollow microparticles can be preferably used. Further, of the hollow microparticles, hollow inorganic microparticles can be preferably used from the viewpoints of the efficiency of polymerization using an ultraviolet reaction, weight and the like. Examples thereof include balloons made of glass such as hollow glass balloons; hollow balloons made of a metal compound such as hollow alumina balloons, hollow balloons made of porcelain such as hollow ceramic balloons; and the like. Use of the above hollow glass balloons allows high-temperature adhesive force to be improved without impairing other characteristics such as the shear strength and holding force.

Examples of the hollow glass balloons include "Glass Microballoon" (trade name) (manufactured by Fuji Silysia Chemical Ltd.), "Cel-Star Z-20", "Cel-Star Z-27", "Cel-Star CZ-31T", "Cel-Star Z-36", "Cel-Star Z-39", "Cel Star Z 39", "Cel-Star T-36" and "Cel-Star PZ-6000" (trade name) (all manufactured by Tokai Kogyo Co., Ltd.), and "Silax Fineballoon" (trade name) (manufactured by Fineballoon Co., Ltd.).

The particle size (average particle size) of the microparticles is not particularly limited, but can be selected, for example, from the range of 1 to 500 μm, preferably 5 to 200 μm, and more preferably 10 to 150 μm.

The specific gravity of the above microparticles is not particularly limited, but, for example, it can be selected from the range of 0.1 to 1.8 g/cm$^3$, preferably 0.2 to 1.5 g/cm$^3$, and more preferably 0.2 to 0.5 g/cm$^3$.

When the specific gravity of the microparticles is less than 0.1 g/cm$^3$, many microparticles rise to the surface in the case where the microparticles are incorporated into the acrylic pressure-sensitive adhesive, followed by mixing, which makes it difficult to uniformly disperse the microparticles in some cases. Further, the glass strength is low, resulting in easy breakage. Adversely, when the specific gravity is more than 1.8 g/cm$^3$, the transmittance of an ultraviolet ray decreases to cause a fear of decreasing the efficiency of the ultraviolet reaction. Further, the acrylic pressure-sensitive adhesive layer including the acrylic pressure-sensitive adhesive becomes heavy, resulting in deterioration in workability.

The amount of the microparticles used is not particularly limited. For example, when the amount used is less than 10% by volume based on the total volume of the acrylic pressure-sensitive adhesive layer including the acrylic pressure-sensitive adhesive, the effect of adding the microparticles is low. On the other hand, when the amount used exceeds 50% by volume, the adhesive force decreases.

(Coloring Pigment)

For example, when the acrylic pressure-sensitive adhesive layer including the acrylic pressure-sensitive adhesive is formed by using the photopolymerization initiator, a pigment (coloring pigment) or a dye can be used in such a degree that photopolymerization is not inhibited, in order to color the acrylic pressure-sensitive adhesive layer including the above acrylic pressure-sensitive adhesive.

When black is desired as the coloring of the acrylic pressure-sensitive adhesive layer including the above acrylic pressure-sensitive adhesive, for example, carbon black can be used. The amount of carbon black used as the coloring pigment is selected, for example, from the range of 0.001 to 0.15% by weight, and preferably 0.01 to 0.1% by weight, based on the total amount of the monomer components for preparing the acrylic polymer, from the viewpoints of the degree of coloring and not inhibiting the photopolymerization reaction.

(Cells)

Further, the acrylic pressure-sensitive adhesive layer including the acrylic pressure-sensitive adhesive of the invention may contain cells. When the cells are contained in the acrylic pressure-sensitive adhesive layer including the acrylic pressure-sensitive adhesive, the acrylic pressure-sensitive adhesive layer including the acrylic pressure-sensitive adhesive can exhibit good adhesiveness to curved surfaces and corrugated surfaces, and further, can exhibit good repulsion resistance.

It is basically desirable that the cells contained in the acrylic pressure-sensitive adhesive layer including the acrylic pressure-sensitive adhesive containing the cells are closed cells. However, the closed cells and interconnected cells may be mixed.

Further, the above cells generally have a spherical shape (particularly, a true spherical shape), but they are unnecessary to be truly spherical, such as spheres having convexities and concavities thereon. The average cell size (diameter) of the above cells is not particularly limited, and can be selected, for example, from the range of 1 to 1,000 μm, preferably 10 to 500 μm, and more preferably 30 to 300 μm.

Incidentally, a gas component (a gas component that forms the cells; referred to as a "cell-forming gas" in some cases) contained in the cells is not particularly limited, and various gas components such as air, as well as inert gases such as nitrogen, carbon dioxide and argon, can be used. As the gas that forms the cells, when the polymerization reaction or the like is performed in a state where the gas that forms the cells is contained, it is important to use one that does not inhibit the reaction. As the gas that forms the cells, nitrogen can be suitably used from the viewpoints of not inhibiting the polymerization reaction or the like, cost and the like.

The amount of the cells miscible in the acrylic pressure-sensitive adhesive layer including the acrylic pressure-sensitive adhesive containing the cells is not particularly limited, and can be appropriately selected depending on the intended use or the like. For example, the amount thereof is from 5 to 50% by volume, and preferably from 8 to 40% by volume, based on the total volume of the acrylic pressure-sensitive adhesive layer including the acrylic pressure-sensitive adhesive containing the cells. When the amount mixed is less than 5% by volume, the effect of mixing the cells is not obtained. Exceeding 50% by volume results in production of cells passing through the acrylic pressure-sensitive adhesive layer including the acrylic pressure-sensitive adhesive to deteriorate the adhesive performance and appearance.

In the acrylic pressure-sensitive adhesive layer including the acrylic pressure-sensitive adhesive containing the cells (referred to as the "cell-containing acrylic pressure-sensitive adhesive layer" in some cases), the form in which the cells are formed is not particularly limited. As the cell-containing acrylic pressure-sensitive adhesive layer, there can be formed, for example, (1) a cell-containing acrylic pressure-sensitive adhesive layer in the form in which the cells are formed by using an acrylic pressure-sensitive adhesive in which the gas component that forms the cells (cell-forming gas) is previously mixed (referred to as a "cell-containing acrylic pressure-sensitive adhesive in some cases), or (2) an acrylic pressure-sensitive adhesive layer including the cell-containing acrylic pressure-sensitive adhesive in the form in which the cells are formed by using an acrylic pressure-sensitive adhesive containing a blowing agent. Incidentally, the amount of the cells in the acrylic pressure-sensitive adhesive can be appropriately selected from the range corresponding to the amount of the cells in the cell-containing acrylic pressure-sensitive adhesive layer. In addition, in the case of the acrylic pressure-sensitive adhesive layer of the above (2) in the form in which the cells are formed by using the acrylic pressure-sensitive adhesive containing the blowing agent, the blowing agent is not particularly limited, and can be appropriately selected, for example, from known blowing agents. As the blowing agent, there can be used, for example, heat-expandable microspheres or the like.

(Other Components)

As other components that may be contained in the acrylic pressure-sensitive adhesive, a thickener, a thixotropic agent, an extender and the like may be added to the acrylic pressure-sensitive adhesive as needed. Examples of the thickeners include acrylic rubber, epichlorohydrin rubber and butyl rubber. Examples of the thixotropic agents include colloidal silica and polyvinylpyrrolidone. Examples of the extenders include calcium carbonate, titanium oxide and clay. In addition to these, a plasticizer, an aging inhibitor, an antioxidant and the like may be appropriately added, without being limited thereto.

(UV Polymerization)

In order to prepare the acrylic pressure-sensitive adhesive tape or sheet of the invention by UV polymerization, an acrylic pressure-sensitive adhesive composition containing the above-mentioned acrylic monomers, photopolymerization initiator and tackifier resin is applied on a substrate, and irradiated with an ultraviolet ray to perform polymerization, thereby forming the pressure-sensitive adhesive layer. In the UV polymerization method, in order to form the acrylic pressure-sensitive adhesive on the substrate, the viscosity of the acrylic pressure-sensitive adhesive composition before polymerization is preferably increased to such a degree as being applicable.

The viscosity of the acrylic pressure-sensitive adhesive composition is desirably from 5 to 50 Pa·s (preferably from 10 to 40 Pa·s), as the viscosity measured by using a BH viscometer under conditions of rotor: No. 5 rotor, the number of rotations: 10 rpm and measuring temperature: 30° C.

When the viscosity of the acrylic pressure-sensitive adhesive composition is less than 5 Pa·s, the liquid flows when applied on the substrate, because the viscosity is too low. When the viscosity exceeds 50 Pa·s, coating becomes difficult, because the viscosity is too high.

Incidentally, the viscosity of the acrylic pressure-sensitive adhesive composition can be adjusted, for example, by a method of blending various polymer components such as acrylic rubber and thickening additives, a method of partially polymerizing monomer components for forming the acrylic polymer (for example, monomer components such as alkyl (meth)acrylates for forming the acrylic polymer, and the like) or the like.

As a specific thickening method, for example, the monomer components for forming the acrylic polymer (for example, the monomer components such as alkyl (meth)acrylates for forming the acrylic polymer, and the like) and the polymerization initiator (for example, the photopolymerization initiator) are mixed with each other to prepare a monomer mixture, and a polymerization reaction depending on the kind of polymerization initiator is performed to the monomer mixture to be able to obtain an acrylic pressure-sensitive adhesive composition in which only a part of the monomer components are polymerized. The tackifier resin and the like are further blended, thereby obtaining an acrylic pressure-sensitive adhesive composition. The acrylic pressure-sensitive adhesive composition thus obtained is applied on a substrate surface by using a coating device.

(Substrate)

As the substrate, there can be used a material as used in the production of pressure-sensitive adhesive tapes or sheets, for example, an appropriate thin leaf body such as a paper-based substrate such as craft paper or Japanese paper; a fiber-based substrate such as cloth, nonwoven fabric or a net; a metal-based substrate such as an aluminum foil or an aluminum plate; a plastic substrate such as a polyester film or a polypropylene film; a rubber-based substrate such as a rubber sheet; a foam such as a foam sheet; or a laminate thereof (particularly, a laminate of a plastic substrate with another substrate, a laminate of plastic substrates (or sheets) with each other, or the like). Of these, the plastic substrate can be suitably used.

Examples of raw materials of such plastic substrates include olefinic resins having an α-olefin as a monomer component, such as polyethylene (PE), polypropylene (PP), ethylene-propylene copolymers and ethylene-vinyl acetate copolymers; polyester-based resins such as polyethylene terephthalate (PET), polyethylene naphthalate (PEN) and polybutylene terephthalate (PBT); polyvinyl chloride (PVC); vinyl acetate-based resins; polyphenylene sulfide (PPS); amide-based resins such as polyamides (nylon) and wholly aromatic polyamides (aramid); polyimide-based resins; and polyether ether ketone (PEEK). These raw materials can be used either alone or as a combination of two or more thereof.

In addition, when the plastic substrate is used, deformability such as the rate of elongation may be controlled by stretching treatment or the like.

In order to improve adhesiveness to the acrylic pressure-sensitive adhesive layer including the acrylic pressure-sensitive adhesive, and the like, the surface of the substrate may be subjected to a commonly employed surface treatment, for example, an oxidation treatment by a chemical or physical method, such as corona treatment, chromic acid treatment, exposure to ozone, exposure to flame, exposure to a high-voltage electrical shock or ionic radiation treatment, and may be subjected to a coating treatment or the like by using a primer, a release agent or the like.

Further, when the acrylic pressure-sensitive adhesive layer including the acrylic pressure-sensitive adhesive is formed by curing by an active energy ray, it is preferred to use a substrate that does not inhibit transmission of an ultraviolet ray.

The thickness of the substrate can be appropriately selected depending on strength, flexibility, the intended use or the like. For example, it is generally 1,000 μm or less (for example, 1 to 1,000 μm, preferably 1 to 500 μm, and more preferably about 3 to about 300 μm), but is not limited thereto. The substrate may have either a single layer form or a laminate form.

(Coating Method)

As a coating method, there is used a coating device that has hitherto been known, such as a roll coater, a bar coater or a die coater.

The acrylic pressure-sensitive adhesive composition can be directly applied on the substrate or the adherend, or can also be applied once on release paper and cured. The acrylic pressure-sensitive adhesive layer including the acrylic pressure-sensitive adhesive, which has been formed on the release paper, can be transferred to the adherend.

The acrylic pressure-sensitive adhesive of the invention can form the acrylic pressure-sensitive adhesive layer composed of the acrylic pressure-sensitive adhesive by curing the acrylic pressure-sensitive adhesive composition with irradiation of an ultraviolet ray by the UV polymerization method.

In the case of the UV polymerization method, the reaction is inhibited by oxygen in the air or oxygen dissolved in the acrylic pressure-sensitive adhesive composition. For this reason, light irradiation is performed under conditions where little oxygen is dissolved.

As a specific method thereof, for example, a surface coated with the acrylic pressure-sensitive adhesive composition is temporarily covered with a cover film such as a polyester film having releasability to prevent contact with oxygen, and ultraviolet irradiation is performed.

Incidentally, the cover film is peeled off when the acrylic pressure-sensitive adhesive layer surface protected by the cover film is utilized (that is to say, when the adherend is attached to the acrylic pressure-sensitive adhesive layer including the acrylic pressure-sensitive adhesive, which is protected by the cover film).

Specifically, as such a cover film, there can be used release paper or the like in common use. As the cover film, there can be used, for example, a low-adhesive substrate composed of a fluorine-based polymer (for example, polytetrafluoroethylene, polychlorotrifluoroethylene, polyvinyl fluoride, polyvinylidene fluoride, a tetrafluoroethylene-hexafluoropropylene copolymer, a chlorofluoroethylene-vinylidene fluoride copolymer or the like), a low-adhesive substrate composed of a nonpolar polymer (for example, a polyolefinic resin such as polyethylene or polypropylene, or the like), or the like, as well as a substrate having a release-treated layer with a release treating agent on at least one side thereof.

On the other hand, the release treating agent constituting the release-treated layer is not particularly limited. For example, a silicone-based release treating agent, a fluorine-based release treating agent, a long-chain alkyl-based release treating agent or the like can be used. The release treating agents can be used either alone or as a combination of two or more thereof.

In addition, the thickness of the cover film, a forming method thereof and the like are not particularly limited.

Light sources used for the above ultraviolet ray include, for example, chemical lamps, black light lamps, low-pressure, high-pressure and ultrahigh-pressure mercury lamps, metal halide lamps and fluorescent lamps. It is preferred that the intensity of ultraviolet irradiation is generally within the range of 0.1 to 300 mW/cm$^2$.

The thickness of the acrylic pressure-sensitive adhesive layer including the acrylic pressure-sensitive adhesive in the invention is not particularly limited, but can be selected, for example, from the range of 5 to 5,000 μm, preferably 10 to 4,000 μm and more preferably 20 to 3,000 μm.

Incidentally, the acrylic pressure-sensitive adhesive layer including the acrylic pressure-sensitive adhesive may have either a single layer form or a laminate form. For example, the acrylic pressure-sensitive adhesive layer can be used by laminating it on another pressure-sensitive adhesive layer.

The acrylic pressure-sensitive adhesive tape or sheet with the acrylic pressure-sensitive adhesive layer formed may be formed in a shape in which it is wound in a roll form, or the acrylic pressure-sensitive adhesive tapes or sheets with the acrylic pressure-sensitive adhesive layers formed may be formed in a shape in which they are laminated.

In addition, when the acrylic pressure-sensitive adhesive tape or sheet with the acrylic pressure-sensitive adhesive layer formed has a shape in which it is wound in a roll form, it can be prepared by winding it in a roll form, for example, in a state where the acrylic pressure-sensitive adhesive layer including the acrylic pressure-sensitive adhesive is protected by the cover film or the release-treated layer formed on a back side of the substrate.

(Constitution of Acrylic Pressure-Sensitive Adhesive Tape or Sheet)

The acrylic pressure-sensitive adhesive tape or sheet of the invention is formed by the acrylic pressure-sensitive adhesive layer including the above acrylic pressure-sensitive adhesive.

Such an acrylic pressure-sensitive adhesive tape or sheet may have a shape of the acrylic pressure-sensitive adhesive tape or sheet in which the acrylic pressure-sensitive adhesive layer of a double-side type with both sides acting as adhesive surfaces (pressure-sensitive adhesive surfaces) is formed, or a shape of the acrylic pressure-sensitive adhesive tape or sheet in which the acrylic pressure-sensitive adhesive layer of a single side type is formed.

FIG. 1 is a schematic cross-sectional view partially showing an example of an acrylic pressure-sensitive adhesive tape or sheet of the invention. In FIG. 1, numerals 1, 2 and 3 are each the acrylic pressure-sensitive adhesive tape or sheet in which an acrylic pressure-sensitive adhesive layer including an acrylic pressure-sensitive adhesive is formed, numeral 4 is the acrylic pressure-sensitive adhesive layer including the acrylic pressure-sensitive adhesive, and numeral 5 is a substrate.

The acrylic pressure-sensitive adhesive tape or sheet 1 represented by FIG. 1(a), in which the acrylic pressure-sensitive adhesive layers are formed, has a constitution that the acrylic pressure-sensitive adhesive layers 4 including the acrylic pressure-sensitive adhesive are formed on both sides of the substrate 5.

Figure 1B:
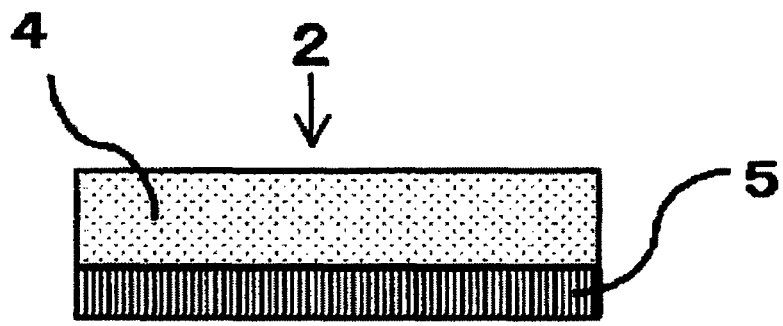

The acrylic pressure-sensitive adhesive tape or sheet 2 represented by FIG. 1(b), in which the acrylic pressure-sensitive adhesive layer is formed, has a constitution that the acrylic pressure-sensitive adhesive layer 2 including the acrylic pressure-sensitive adhesive is formed on one side of the substrate 5.

Figure 1C:
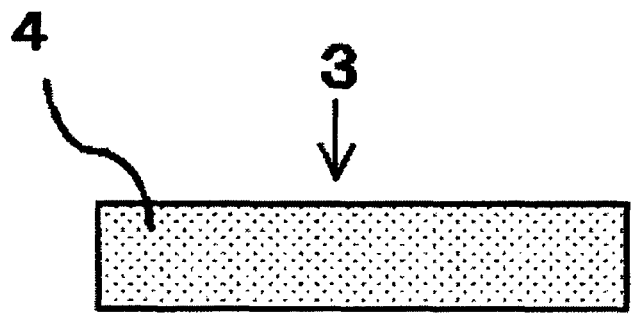

The acrylic pressure-sensitive adhesive tape or sheet 3 represented by FIG. 1(c), in which the acrylic pressure-sensitive adhesive layer is formed, has a constitution that only the acrylic pressure-sensitive adhesive layer 4 including the acrylic pressure-sensitive adhesive is formed.

The acrylic pressure-sensitive adhesive is applied on a predetermined surface, and then, cured by heating or irradiation of the ultraviolet ray, thereby being able to suitably form the acrylic pressure-sensitive adhesive tape or sheet in which the acrylic pressure-sensitive adhesive layer is formed.

EXAMPLES

The invention will be described in detail below with reference to Examples, but is not construed as being limited by these Examples.

Example 1

Synthesis of Acrylic Polymer Syrup 1

After 65 parts by weight of 2-ethylhexyl acrylate (2EHA), 30 parts by weight of butyl acrylate (BA) and 5 parts by weight of acrylic acid (AA) as monomers, and 0.1 part by weight of "Irgacure-651" (trade name) (manufactured by Ciba Specialty Chemicals Corp.) as a photopolymerization initiator were blended, nitrogen gas was blown thereinto to remove dissolved oxygen. Thereafter, an ultraviolet ray was irradiated to a viscosity (BH viscometer, No. 5 rotor, 10 rpm, measuring temperature: 30° C.) of about 15 Pa·s to prepare acrylic polymer syrup 1) in which the monomers were partially polymerized.

<Synthesis of Acrylic Oligomer 1>

After 100 parts of cyclohexyl methacrylate (CHMA) and 3.5 parts by weight of thioglycolic acid were blended, nitrogen gas was blown thereinto to remove dissolved oxygen. Subsequently, the temperature was raised to 90° C., and 0.005 part by weight of Perhexyl O (manufactured by NOF Corp.) and 0.01 part by weight of Perhexyl D (manufactured by NOF Corp.) were mixed therewith at that time. After further stirring at 90° C. for 1 hour, the temperature was raised to 130° C., taking 1 hour. Thereafter, after stirring at 130° C. for 1 hour, the temperature was raised to 170° C., taking 30 minutes, followed by stirring at 170° C. for 60 minutes. Then, the pressure was reduced in a state of 170° C. to remove residual monomers, thereby obtaining acrylic oligomer 1). Incidentally, the weight average molecular weight of the resulting oligomer was 4,000. Further, the glass transition temperature (Tg) thereof was 55° C.

<Preparation of Acrylic Pressure-Sensitive Adhesive Composition>

With 100 parts by weight of acrylic polymer syrup 1) obtained by the above method, 0.1 part by weight of hexanediol diacrylate and 20 parts by weight of acrylic oligomer 1) obtained above were blended to obtain an acrylic pressure-sensitive adhesive composition.

<Method for Preparing Acrylic Pressure-Sensitive Adhesive Tape>

The above acrylic pressure-sensitive adhesive composition was applied with a roll coater on a release-treated surface of a one-side release-treated polyester film (polyester release liner) having a thickness of 38 μm to a thickness of 50 μm. Subsequently, a polyester release liner of the same kind was attached to the other surface of the above acrylic pressure-sensitive adhesive composition applied, in such a manner that a release-treated surface thereof was disposed on the above acrylic pressure-sensitive adhesive composition. Then, ultraviolet irradiation was performed from both sides by using black light lamps of 5 mW/cm² for 3 minutes. Thus, an acrylic pressure-sensitive adhesive tape in which an acrylic pressure-sensitive adhesive layer having a thickness of 50 μm was formed was obtained.

Example 2

Synthesis of Acrylic Polymer Syrup 2

Acrylic polymer syrup 2) was obtained by the same preparation method as in the synthesis of acrylic polymer syrup 1) except that 55 parts by weight of 2-ethylhexyl acrylate (2EHA) and 40 parts by weight of butyl acrylate (BA) were used in place of 65 parts by weight of 2-ethylhexyl acrylate (2EHA) and 30 parts by weight of butyl acrylate (BA).

<Preparation of Acrylic Pressure-Sensitive Adhesive Composition>

With 100 parts by weight of acrylic polymer syrup 2) obtained by the above method, 0.1 part by weight of hexanediol diacrylate and 20 parts by weight of the above acrylic oligomer 1) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 3

Synthesis of Acrylic Polymer Syrup 3

Acrylic polymer syrup 3) was obtained by the same preparation method as in the synthesis of acrylic polymer syrup 1) except that 55 parts by weight of 2-ethylhexyl acrylate (2EHA) and 40 parts by weight of octadecyl acrylate (ODA) were used in place of 65 parts by weight of 2-ethylhexyl acrylate (2EHA) and 30 parts by weight of butyl acrylate (BA).

<Preparation of Acrylic Pressure-Sensitive Adhesive Composition>

With 100 parts by weight of acrylic polymer syrup 3) obtained by the above method, 0.1 part by weight of hexanediol diacrylate and 20 parts by weight of the above acrylic oligomer 1) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 4

Synthesis of Acrylic Polymer Syrup 4

Acrylic polymer syrup 4) was obtained by the same preparation method as in the synthesis of acrylic polymer syrup 1) except that 95 parts by weight of 2-ethylhexyl acrylate (2EHA) was used in place of 65 parts by weight of 2-ethylhexyl acrylate (2EHA) and 30 parts by weight of butyl acrylate (BA).

<Synthesis of Acrylic Oligomer 2>

Acrylic oligomer 2) was obtained by the same preparation method as in the synthesis of acrylic oligomer 1) except that 75 parts by weight of cyclohexyl methacrylate (CHMA) and 25 parts by weight of acryloyl morpholine (ACMO) were used in place of 100 parts by weight of cyclohexyl methacrylate (CHMA). Incidentally, the weight average molecular weight of the resulting acrylic oligomer was 3,800. Further, the glass transition temperature (Tg) thereof was 75° C.

<Preparation of Acrylic Pressure-Sensitive Adhesive Composition>

With 100 parts by weight of acrylic polymer syrup 4) obtained by the above method, 0.1 part by weight of hexanediol diacrylate and 20 parts by weight of the above acrylic oligomer 2) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 5

Synthesis of Acrylic Oligomer 3

Acrylic oligomer 3) was obtained by the same preparation method as in the synthesis of acrylic oligomer 1) except that 75 parts by weight of cyclohexyl methacrylate (CHMA) and 25 parts by weight of diethylacrylamide (DEAA) were used in place of 100 parts by weight of cyclohexyl methacrylate (CHMA). Incidentally, the weight average molecular weight of the resulting acrylic oligomer was 4,100. Further, the glass transition temperature (Tg) thereof was 70° C.

<Preparation of Acrylic Pressure-Sensitive Adhesive Composition>

With 100 parts by weight of the above acrylic polymer syrup 4), 0.1 part by weight of hexanediol diacrylate and 20 parts by weight of the above acrylic oligomer 3) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 6

Synthesis of Acrylic Oligomer 4

Acrylic oligomer 4) was obtained by the same preparation method as in the synthesis of acrylic oligomer 1) except that 60 parts by weight of cyclohexyl methacrylate (CHMA) and 40 parts by weight of isobutyl methacrylate (IBMA) were used in place of 100 parts by weight of cyclohexyl methacrylate (CHMA). Incidentally, the weight average molecular weight of the resulting oligomer was 3,700. Further, the glass transition temperature (Tg) thereof was 50° C.

<Preparation of Acrylic Pressure-Sensitive Adhesive Composition>

With 100 parts by weight of the above acrylic polymer syrup 4), 0.1 part by weight of hexanediol diacrylate and 20 parts by weight of the above acrylic oligomer 4) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 7

Synthesis of Acrylic Oligomer 5

Acrylic oligomer 5) was obtained by the same preparation method as in the synthesis of acrylic oligomer 1) except that 70 parts by weight of cyclohexyl methacrylate (CHMA) and 30 parts by weight of isobutyl methacrylate (IBMA) were used in place of 100 parts by weight of cyclohexyl methacrylate (CHMA). Incidentally, the weight average molecular weight of the resulting acrylic oligomer was 4,000. Further, the glass transition temperature (Tg) thereof was 53° C.

<Preparation of Acrylic Pressure-Sensitive Adhesive Composition>

With 100 parts by weight of the above acrylic polymer syrup 4), 0.1 part by weight of hexanediol diacrylate and 20 parts by weight of the above acrylic oligomer 5) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 8

Synthesis of Acrylic Oligomer 6

Acrylic oligomer 6) was obtained by the same preparation method as in the synthesis of acrylic oligomer 1) except that 60 parts by weight of cyclohexyl methacrylate (CHMA) and 40 parts by weight of isobornyl methacrylate (IBXMA) were used in place of 100 parts by weight of cyclohexyl methacrylate (CHMA). Incidentally, the weight average molecular weight (Mw) of the resulting acrylic oligomer was 4,300. Further, the glass transition temperature (Tg) thereof was 95° C.

<Preparation of Acrylic Pressure-Sensitive Adhesive Composition>

With 100 parts by weight of the above acrylic polymer syrup 4), 0.1 part by weight of hexanediol diacrylate and 20 parts by weight of the above acrylic oligomer 5) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 9

Synthesis of Acrylic Polymer Syrup 5

Acrylic polymer syrup 5) was obtained by the same preparation method as in the synthesis of acrylic polymer syrup 1) except that 94 parts by weight of 2-ethylhexyl acrylate (2EHA) and 6 parts by weight of acrylic acid (AA) were used in place of 65 parts by weight of 2-ethylhexyl acrylate (2EHA), 30 parts by weight of butyl acrylate (BA) and 5 parts by weight of acrylic acid (AA).

<Preparation of Acrylic Pressure-Sensitive Adhesive Composition>

With 100 parts by weight of acrylic polymer syrup 5) obtained by the above method, 0.1 part by weight of hexanediol diacrylate and 20 parts by weight of the above acrylic oligomer 4) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Example 10

Preparation of Acrylic Pressure-Sensitive Adhesive Composition

With 100 parts by weight of acrylic polymer syrup 5) obtained by the above method, 0.1 part by weight of 2-isocyanatoethyl acrylate and 20 parts by weight of the above acrylic oligomer 4) were blended to obtain an acrylic pressure-sensitive adhesive composition.
<Method for Preparing Acrylic Pressure-Sensitive Adhesive Tape>
An acrylic pressure-sensitive adhesive tape was obtained by the same preparation method as in Example 1.

Example 11

Synthesis of Acrylic Polymer Syrup 6

Acrylic polymer syrup 6) was obtained by the same preparation method as in the synthesis of acrylic polymer syrup 1) except that 92 parts by weight of 2-ethylhexyl acrylate (2EHA) and 8 parts by weight of acrylic acid (AA) were used in place of 65 parts by weight of 2-ethylhexyl acrylate (2EHA), 30 parts by weight of butyl acrylate (BA) and 5 parts by weight of acrylic acid (AA).
<Preparation of Acrylic Pressure-Sensitive Adhesive Composition>
With 100 parts by weight of acrylic polymer syrup 6) obtained by the above method, 0.1 part by weight of 2-isocyanatoethyl acrylate and 20 parts by weight of the above acrylic oligomer 4) were blended to obtain an acrylic pressure-sensitive adhesive composition.
<Method for Preparing Acrylic Pressure-Sensitive Adhesive Tape>
An acrylic pressure-sensitive adhesive tape was obtained by the same preparation method as in Example 1.

Example 12

Preparation of Acrylic Pressure-Sensitive Adhesive Composition

With 100 parts by weight of the above acrylic polymer syrup 6), 0.1 part by weight of trimethylolpropane triacrylate and 20 parts by weight of the above acrylic oligomer 6) were blended to obtain an acrylic pressure-sensitive adhesive composition.
<Method for Preparing Acrylic Pressure-Sensitive Adhesive Tape>
An acrylic pressure-sensitive adhesive tape was obtained by the same preparation method as in Example 1.

Example 13

Synthesis of Acrylic Polymer Syrup 7

Acrylic polymer syrup 7) was obtained by the same preparation method as in the synthesis of acrylic polymer syrup 1) except that 90 parts by weight of 2-ethylhexyl acrylate (2EHA) and 10 parts by weight of acrylic acid (AA) were used in place of 65 parts by weight of 2-ethylhexyl acrylate (2EHA), 30 parts by weight of butyl acrylate (BA) and 5 parts by weight of acrylic acid (AA).
<Preparation of Acrylic Pressure-Sensitive Adhesive Composition>
With 100 parts by weight of acrylic polymer syrup 7) obtained by the above method, 0.1 part by weight of dipentaerythritol hexaacrylate and 20 parts by weight of the above acrylic oligomer 4) were blended to obtain an acrylic pressure-sensitive adhesive composition.
<Method for Preparing Acrylic Pressure-Sensitive Adhesive Tape>
An acrylic pressure-sensitive adhesive tape was obtained by the same preparation method as in Example 1.

Example 14

Preparation of Acrylic Pressure-Sensitive Adhesive Composition

With 100 parts by weight of acrylic polymer syrup 1) obtained by the above method, 0.1 part by weight of hexanediol diacrylate and 20 parts by weight of the above acrylic oligomer 4) were blended to obtain an acrylic pressure-sensitive adhesive composition.
<Method for Preparing Acrylic Pressure-Sensitive Adhesive Tape>
An acrylic pressure-sensitive adhesive tape was obtained by the same preparation method as in Example 1.

Example 15

Synthesis of Acrylic Polymer 8

After 55 parts by weight of butyl acrylate (BA), 40 parts by weight of octadecyl acrylate (ODA) and 5 parts by weight of acrylic acid (AA) as monomers, 0.1 part by weight of azobisisobutyronitrile as a photopolymerization initiator and 150 parts by weight of ethyl acetate as a solvent were blended, nitrogen gas was blown thereinto to remove dissolved oxygen. Thereafter, polymerization was performed at 60° C. for 7 hours to obtain acrylic polymer 8).
<Preparation of Solution Polymerization Type Pressure-Sensitive Adhesive Composition 1)>
With 100 parts by weight of solid matter of acrylic polymer 8) obtained, 20 parts by weight of a rosin ester-based tackifier, Pensel D-135 (manufactured by Arakawa Chemical Industries, Ltd.) and 0.03 part by weight of 1,3-bis(N,N-diglycidylaminomethyl)cyclohexane as a crosslinking agent were blended to obtain a solution polymerization type pressure-sensitive adhesive composition.
<Method for Preparing Acrylic Pressure-Sensitive Adhesive Tape>
The above acrylic pressure-sensitive adhesive composition was applied with a roll coater on a release-treated surface of a one-side release-treated polyester film having a thickness of 38 μm, followed by drying at 100° C. for 3 minutes to obtain an acrylic pressure-sensitive adhesive tape so as to have a thickness of 50 μm.

Comparative Example 1

Preparation of Acrylic Pressure-Sensitive Adhesive Composition

With 100 parts by weight of the above acrylic polymer syrup 4), 0.1 part by weight of hexanediol diacrylate and 20 parts by weight of acrylic oligomer 1) obtained above were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Comparative Example 2

Synthesis of Acrylic Polymer Syrup 9

Acrylic polymer syrup 9) was obtained by the same preparation method as in the synthesis of acrylic polymer syrup 1) except that 85 parts by weight of 2-ethylhexyl acrylate (2EHA) and 10 parts by weight of butyl acrylate (BA) were used in place of 65 parts by weight of 2-ethylhexyl acrylate (2EHA) and 30 parts by weight of butyl acrylate (BA).

<Preparation of Acrylic Pressure-Sensitive Adhesive Composition>

With 100 parts by weight of acrylic polymer syrup 9) obtained by the above method, 0.1 part by weight of hexanediol diacrylate and 20 parts by weight of the above acrylic oligomer 1) were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Comparative Example 3

Synthesis of Acrylic Oligomer 7

Acrylic oligomer 7) was obtained by the same preparation method as in the synthesis of acrylic oligomer 1) except that 90 parts by weight of cyclohexyl methacrylate (CHMA) and 10 parts by weight of isobornyl methacrylate (IBXMA) were used in place of 100 parts by weight of cyclohexyl methacrylate (CHMA). The weight average molecular weight of the resulting acrylic oligomer was 4,300. Further, the glass transition temperature (Tg) thereof was 65° C.

<Preparation of Acrylic Pressure-Sensitive Adhesive Composition>

With 100 parts by weight of acrylic polymer syrup 4) obtained by the above method, 0.1 part by weight of hexanediol diacrylate and 20 parts by weight of acrylic oligomer 7) obtained above were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Comparative Example 4

Preparation of Acrylic Pressure-Sensitive Adhesive Composition

With 100 parts by weight of acrylic polymer syrup 9) obtained by the above method, 0.1 part by weight of hexanediol diacrylate and 20 parts by weight of acrylic oligomer 7) obtained above were blended to obtain an acrylic pressure-sensitive adhesive composition.

<Method for Preparing Acrylic Pressure-Sensitive Adhesive Tape>

An acrylic pressure-sensitive adhesive tape was obtained by the same preparation method as in Example 1.

Comparative Example 5

Synthesis of Acrylic Polymer 10

Acrylic polymer 10) was obtained by the same preparation method as in the synthesis of acrylic polymer 8) except that 95 parts by weight of butyl acrylate (BA) was used in place of 55 parts by weight of butyl acrylate (BA) and 40 parts by weight of octadecyl acrylate (ODA).

<Preparation of Solution Polymerization Type Pressure-Sensitive Adhesive Composition 2)>

Solution polymerization type pressure-sensitive adhesive composition 2) was obtained by the same preparation method as in Example 15 except that acrylic polymer 10) was used in place of acrylic polymer 8).

<Method for Preparing Acrylic Pressure-Sensitive Adhesive Tape>

An acrylic pressure-sensitive adhesive tape was obtained by the same preparation method as in Example 10.

The compositions in Examples and Comparative Examples are sown in Table 3. Incidentally, abbreviations used herein are the abbreviations of the main monomers shown in Table 2 described above.

TABLE 3

| | | Acrylic Polymer | | | Tackifier Resin | | | | |
|---|---|---|---|---|---|---|---|---|---|
| | | | Difference in SP Value | Monomer Unit | Kind | Mw | Tg (° C.) | Difference in SP Value | Monomer Unit |
| | Kind | | | | | | | | |
| Example | 1 | 1) | 1.13 | 2EHA/BA/AA = 65/30/5 | Oligomer 1) | 4000 | 55 | — | CHMA = 100 |
| | 2 | 2) | 1.13 | 2EHA/BA/AA = 55/40/5 | 1) | 4000 | 55 | — | CHMA = 100 |
| | 3 | 3) | 0.46 | 2EHA/ODA/AA = 55/40/5 | 1) | 4000 | 55 | — | CHMA = 100 |
| | 4 | 4) | — | 2EHA/AA = 95/5 | 2) | 3800 | 75 | 5.87 | CHMA/ACMO = 75/25 |
| | 5 | 4) | — | 2EHA/AA = 95/5 | 3) | 4100 | 70 | 3.02 | CHMA/DEAA = 75/25 |
| | 6 | 4) | — | 2EHA/AA = 95/5 | 4) | 3700 | 50 | 1.16 | CHMA/IBMA = 60/40 |
| | 7 | 4) | — | 2EHA/AA = 95/5 | 5) | 4000 | 53 | 1.16 | CHMA/IBMA = 70/30 |
| | 8 | 4) | — | 2EHA/AA = 95/5 | 6) | 4300 | 95 | 0.71 | CHMA/IBXMA = 60/40 |
| | 9 | 5) | — | 2EHA/AA = 94/6 | 4) | 3700 | 50 | 1.16 | CHMA/IBMA = 60/40 |
| | 10 | 5) | — | 2EHA/AA = 94/6 | 4) | 3700 | 50 | 1.16 | CHMA/IBMA = 60/40 |
| | 11 | 6) | — | 2EHA/AA = 92/8 | 4) | 3700 | 50 | 1.16 | CHMA/IBMA = 60/40 |
| | 12 | 6) | — | 2EHA/AA = 92/8 | 6) | 4300 | 95 | 0.71 | CHMA/IBXMA = 60/40 |
| | 13 | 7) | — | 2EHA/AA = 90/10 | 4) | 3700 | 50 | 1.16 | CHMA/IBMA = 60/40 |
| | 14 | 1) | 1.13 | 2EHA/BA/AA = 65/30/5 | 4) | 3700 | 50 | 1.16 | CHMA/IBMA = 60/40 |
| | 15 | 8) | 1.59 | 2EHA/ODA/AA = 55/40/5 | Rosin | — | — | — | Pensel D-135 |

TABLE 3-continued

|  |  | Acrylic Polymer | | | Tackifier Resin | | | | |
|---|---|---|---|---|---|---|---|---|---|
|  |  | Kind | Difference in SP Value | Monomer Unit | Kind | Mw | Tg (°C.) | Difference in SP Value | Monomer Unit |
| Comparative Example | 1 | 4) | — | 2EHA/AA = 95/5 | Oligomer 1) | 4000 | 55 | — | CHMA = 100 |
|  | 2 | 9) | — | 2EHA/BA/AA = 85/10/5 | 1) | 4000 | 55 | — | CHMA = 100 |
|  | 3 | 4) | — | 2EHA/AA = 95/5 | 7) | 4300 | 65 | — | CHMA/IBMA = 90/10 |
|  | 4 | 9) | — | 2EHA/BA/AA = 85/10/5 | 7) | 4300 | 65 | — | CHMA/IBMA = 90/10 |
|  | 5 | 10) | — | BA/AA = 95/5 | Rosin | — | — | — | Pensel D-135 |

(Evaluation Item)

Adhesive Strength

After prepared, the acrylic pressure-sensitive adhesive tape was allowed to stand at room temperature for 3 days, and then, cut to a width of 25 mm and a length of 100 mm. The polyester release liner on one side of the resulting sample piece was peeled, and a 25 μm thick polyester substrate subjected to no release treatment was attached thereto. The polyester release liner on the other side was peeled, and the sample was attached to a poorly adherent coated plate (epoxy group-containing acrylic-polyacidic coating) as an adherend, whose surface was wiped with isopropyl alcohol by one-way pressing with a 5 kg weight roller. After standing at 23° C. for 30 minutes, the force required for peeling (180° peel, the rate of pulling: 50 mm/min) was measured under an atmosphere of 23° C. and 65% R.H., and this was taken as the initial adhesive strength.

Further, after prepared, the acrylic pressure-sensitive adhesive tape was allowed to stand at room temperature for 3 days, and further stored at 90° C. for 4 days. Thereafter, the force required for peeling was measured for the acrylic pressure-sensitive adhesive tape by the same method, and this was taken as the adhesive strength after storage.

Measurement results of the adhesive strength of each acrylic pressure-sensitive adhesive tape and the rate of change (=(adhesive strength after storage)/(initial adhesive strength)) are shown in Table 4.

TABLE 4

|  |  | Adhesive Strength (N/25 mm) | | Rate of Change |
|---|---|---|---|---|
|  |  | Initial | After Storage |  |
| Example | 1 | 15.1 | 13.8 | 0.91 |
|  | 2 | 14.9 | 14.2 | 0.95 |
|  | 3 | 14.8 | 14.1 | 0.95 |
|  | 4 | 15.8 | 14.6 | 0.92 |
|  | 5 | 15.3 | 14.4 | 0.94 |
|  | 6 | 16.1 | 15.6 | 0.97 |
|  | 7 | 16.1 | 15.2 | 0.94 |
|  | 8 | 16.4 | 14.5 | 0.88 |
|  | 9 | 16.2 | 14.8 | 0.91 |
|  | 10 | 16.4 | 16.0 | 0.98 |
|  | 11 | 16.8 | 15.4 | 0.92 |
|  | 12 | 17.0 | 15.0 | 0.88 |
|  | 13 | 17.4 | 15.5 | 0.89 |
|  | 14 | 15.3 | 15.1 | 0.99 |
|  | 15 | 12.5 | 11.5 | 0.93 |
| Comparative Example | 1 | 16.5 | 10.3 | 0.62 |
|  | 2 | 15.8 | 10.5 | 0.66 |
|  | 3 | 17.1 | 10.1 | 0.59 |
|  | 4 | 16.2 | 11.1 | 0.69 |
|  | 5 | 11.6 | 7.6 | 0.66 |

From Examples 1 to 3 of Table 4 described above, it is known, from the fact that the rate of change in adhesive strength is small, that an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more, shows excellent adhesive performance to the poorly adherent coated plate, and that changes in adhesive performance after storage are small. Further, from Examples 4 to 13, it is known, from the fact that the rate of change in adhesive strength is small, that an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the tackifier resin contains two kinds of monomer units having a difference in solubility parameter (SP value) of 0.2 $(MPa)^{1/2}$ or more, each in an amount of 15% by weight or more, shows excellent adhesive performance to the poorly adherent coated plate, and that changes in adhesive performance after storage are small. Furthermore, from Example 14, it is known, from the fact that the rate of change in adhesive strength is small, that an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more, and the tackifier resin contains two kinds of monomer units having a difference in solubility parameter (SP value) of 0.2 $(MPa)^{1/2}$ or more, each in an amount of 15% by weight or more, shows excellent adhesive performance to the poorly adherent coated plate, and that changes in adhesive performance after storage are small. Moreover, from Example 15, it is known, from the fact that the rate of change in adhesive strength is small, that an acrylic pressure-sensitive adhesive including an acrylic polymer containing, as a monomer unit, an alkyl (meth)acrylate including an alkyl group having 1 to 20 carbon atoms in an amount of 50% by weight or more, and a tackifier resin, in which the acrylic polymer contains two kinds of monomer units having a difference in solubility parameter (SP value) of 0.2 $(MPa)^{1/2}$ or more, each in an amount of 15% by weight or more, shows excellent adhesive performance to the poorly adherent coated plate, even when the tackifier resin is a rosin-based resin, and that changes in adhesive performance after storage are small.

Compared with this, in Comparative Examples 1 to 4, the acrylic polymer and the tackifier resin do not each contain two kinds of monomer units having a difference in solubility parameter (SP value) of 0.2 $(MPa)^{1/2}$ or more, and it is known that the rate of change in adhesive strength is large, and that changes in adhesive performance to the poorly adherent coated plate and in adhesive performance after storage are large, compared with Examples 1 to 15. Further, in Comparative Example 5, the acrylic polymer and the tackifier resin do not each contain two kinds of monomer units having a difference in solubility parameter (SP value) of 0.2 $(MPa)^{1/2}$ or more, even when the tackifier resin is a rosin-based resin, and it is known that the rate of change in adhesive strength is large, and that changes in adhesive performance to the poorly adherent coated plate and in adhesive performance after storage are large, compared with Examples 1 to 15.

While the invention has been described in detail with reference to specific embodiments thereof, it will be apparent to one skilled in the art that various changes and modifications can be made therein without departing from the spirit and scope of the invention.

Incidentally, the present application is based on Japanese Patent Application No. 2008-068595 filed on Mar. 17, 2008 and Japanese Patent Application No. 2009-038706 filed on Feb. 21, 2009, the entire of which is incorporated herein by reference.

Further, all references cited herein are incorporated in their entirety.

INDUSTRIAL APPLICABILITY

According to the acrylic pressure-sensitive adhesive of the invention, the pressure-sensitive adhesive has the above constitution, so that it is possible to provide the acrylic pressure-sensitive adhesive showing excellent adhesive performance to polyolefin adherends or poorly adherent coated plates and having small changes in adhesive performance after storage, the acrylic pressure-sensitive adhesive layer including the acrylic pressure-sensitive adhesive, and the acrylic pressure-sensitive adhesive tape or sheet.

The invention claimed is:

1. An acrylic pressure-sensitive adhesive comprising:
   a) an acrylic polymer containing, as monomer units, an alkyl (meth)acrylate including an alkyl group having 1 to 20 carbon atoms in an amount of 50% by weight or more and a polar group-containing monomer in an amount of 5% by weight or more; and
   b) a tackifier resin,
   wherein the tackifier resin is an acrylic oligomer having a glass transition temperature (Tg) of 20° C. or more, and
   wherein the tackifier resin b) contains two kinds of monomer units having a difference in solubility parameter (SP value) of 0.2 $(MPa)^{1/2}$ or more, each in an amount of 15% by weight or more.

2. An acrylic pressure-sensitive adhesive comprising:
   a) an acrylic polymer containing, as monomer units, an alkyl (meth)acrylate including an alkyl group having 1 to 20 carbon atoms in an amount of 50% by weight or more and a polar group-containing monomer in an amount of 5% by weight or more; and
   b) a tackifier resin,
   wherein the tackifier resin is an acrylic oligomer having a glass transition temperature (Tg) of 20° C. or more, and wherein the acrylic polymer a) contains two kinds of monomer units having a difference in solubility parameter (SP value) of 0.2 $(MPa)^{1/2}$ or more, each in an amount of 15% by weight or more, and the tackifier resin b) contains two kinds of monomer units having a difference in solubility parameter (SP value) of 0.2 $(MPa)^{1/2}$ or more, each in an amount of 15% by weight or more.

3. The acrylic pressure-sensitive adhesive according to claim 1 or 2, wherein at least one of the monomer units of the acrylic polymer is 2 ethylhexyl acrylate or butyl acrylate.

4. The acrylic pressure-sensitive adhesive according to claim 1 or 2, wherein at least one of the monomer units of the acrylic polymer is 2 ethylhexyl acrylate or butyl acrylate and at least one of the monomer units is butyl acrylate or octadecyl acrylate.

5. The acrylic pressure-sensitive adhesive according to claim 1 or 2, wherein the acrylic oligomer has a weight-average molecular weight of 2,000 to 20,000.

6. The acrylic pressure-sensitive adhesive according to claim 1 or 2, wherein the acrylic oligomer contains, as a monomer unit, cyclohexyl (meth)acrylate in an amount of 15% by weight or more.

7. The acrylic pressure-sensitive adhesive according to claim 1 or 2, wherein the acrylic oligomer contains, as monomer units, cyclohexyl(meth)acrylate and any one of acryloyl morpholine, diethylacrylamide, isobutyl methacrylate and isobornyl methacrylate, each in an amount of 15% by weight or more.

8. The acrylic pressure-sensitive adhesive according to claim 1 or 2, which is obtained by irradiating an ultraviolet ray to an acrylic pressure-sensitive adhesive composition comprising: an acrylic polymer containing an alkyl (meth)acrylate including an alkyl group having 1 to 20 carbon atoms in an amount of 50% by weight or more or a partially polymerized product thereof; a photopolymerization initiator; and a tackifier resin.

9. An acrylic pressure-sensitive adhesive layer comprising the acrylic pressure-sensitive adhesive according to claim 1 or 2.

10. An acrylic pressure-sensitive adhesive tape or sheet comprising the acrylic pressure-sensitive adhesive layer according to claim 9.

11. The acrylic pressure-sensitive adhesive tape or sheet according to claim 10, wherein the tape or sheet further comprises a substrate, and the acrylic pressure-sensitive adhesive layer is formed on at least one side of the substrate.

12. The acrylic pressure-sensitive adhesive according to claim 5, wherein the acrylic oligomer contains, as a monomer unit, cyclohexyl (meth)acrylate in an amount of 15% by weight or more.

13. The acrylic pressure-sensitive adhesive according to claim 5, wherein the acrylic oligomer contains, as monomer units, cyclohexyl (meth)acrylate and any one of acryloyl morpholine, diethylacrylamide, isobutyl methacrylate and isobornyl methacrylate, each in an amount of 15% by weight or more.

* * * * *